United States Patent [19]

Van Der Eerden

[11] Patent Number: 4,899,421

[45] Date of Patent: Feb. 13, 1990

[54] METHOD AND APPARATUS FOR REMOVING FECAL MATTER IN POULTRY

[75] Inventor: Harry Van Der Eerden, Gainesville, Ga.

[73] Assignee: Stork-Gamco, Inc., Gainesville, Ga.

[21] Appl. No.: 229,910

[22] Filed: Aug. 8, 1988

[51] Int. Cl.⁴ ............................................. A22C 21/00
[52] U.S. Cl. ......................................................... 17/11
[58] Field of Search ............................................ 17/11

[56] References Cited

U.S. PATENT DOCUMENTS

| | | | |
|---|---|---|---|
| 2,997,736 | 8/1961 | Ine | 17/11 |
| 3,137,031 | 6/1964 | Ine | 17/11 X |
| 3,921,255 | 11/1975 | La Barber | 17/11 |
| 4,024,603 | 5/1977 | Harben, Jr. et al. | 17/11 |
| 4,153,972 | 5/1979 | Harben et al. | 17/11 |
| 4,677,709 | 7/1987 | Dixon | 17/11 |

*Primary Examiner*—Willis Little
*Attorney, Agent, or Firm*—Hurt, Richardson, Garner, Todd & Cadenhead

[57] ABSTRACT

An apparatus for removing the fecal matter from the rectal cavity of slaughtered poultry in a poultry processing line, prior to evisceration, including a hollow probe for insertion into and extraction form the rectal cavity, the movements thereof being controlled in such a manner that, after the poultry is positioned, the probe is inserted into the rectal cavity of the poultry while pulling a pulsating vacuum and then extracted while pulling a continuous vacuum thus removing the fecal matter in a two-stage process. A water flush for the probe is provided to thoroughly clean the probe of fecal matter with a continuous stream of water near the back of the apparatus prior to automatically engaging other oncoming birds at the fecal removal apparatus. As an alternate embodiment, the vacuum can be combined with a water flush to facilitate the removal of the fecal matter.

27 Claims, 7 Drawing Sheets

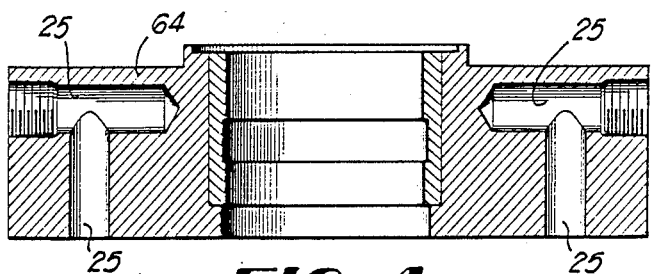
FIG 4
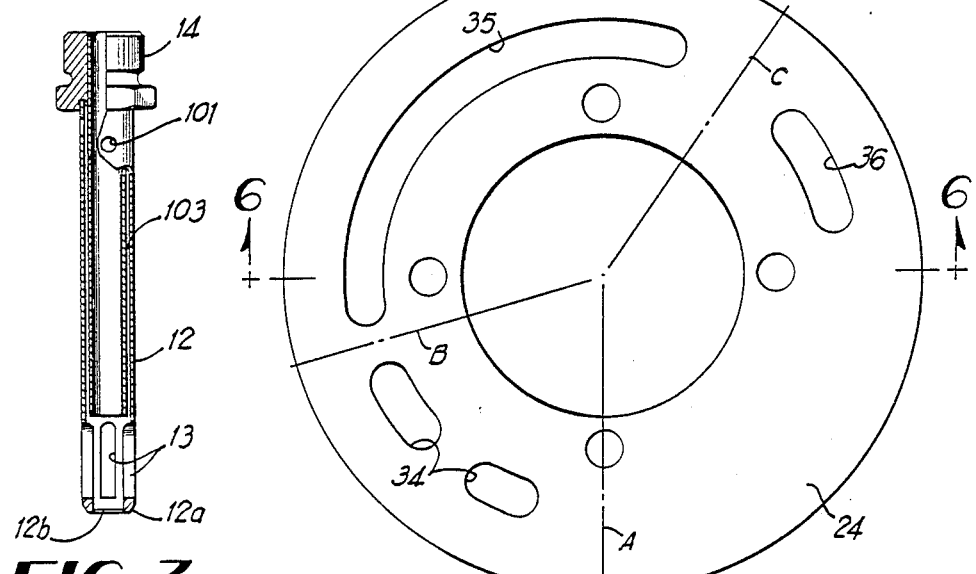
FIG 3
FIG 5
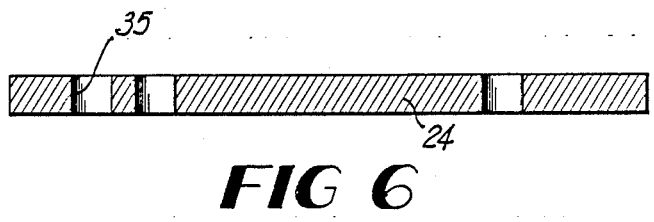
FIG 6

METHOD AND APPARATUS FOR REMOVING FECAL MATTER IN POULTRY

BACKGROUND OF THE INVENTION

1. Field of the Invention

This invention relates to a method and apparatus for minimizing fecal contamination of poultry by removing the fecal matter from the rectal cavity of slaughtered poultry prior to venting and eviscerating the poultry.

2. Description of the Prior Art

In the majority of the prior art, the fecal matter was not removed from the rectal cavity of slaughtered poultry as a separate step during processing, but was left in the rectal cavity of the poultry until the entire packet of entrails was removed during the evisceration process. In the one known device developed for the removal of fecal matter, U.S. Pat. No. 4,739,539, the poultry is passed between two rotating plates, one of which applies pressure against the wall of the poultry's abdominal cavity sufficient to discharge the fecal matter from the poultry through its anus.

In poultry processing employing the prior art, fecal matter contaminates the poultry either by exiting the entrails, through natural openings or through tears created by the machinery or by spilling out over the poultry during the entrail packet removal process. Theoretically, subsequent water washes remove the fecal matter from the poultry's inner and outer skin surfaces. In practice, however, not all of the fecal matter is washed off and the poultry remains contaminated. Such fecal matter contamination remains on the poultry throughout the processing, packaging, shipping, and retail stages, and is a cause for many human diseases such as salmonella and campylobacter poisoning. U.S.D.A. standards provide for the complete removal of fecal matter from poultry, the failure of which renders the poultry legally unfit for sale for human consumption.

SUMMARY OF THE INVENTION

It is a primary objective of the present invention to obviate this drawback and to provide an apparatus by means of which the fecal matter is removed from the poultry prior to venting and evisceration without contaminating the poultry by contacting the poultry with the fecal matter.

It is a further objective of the present invention to provide a means for removing fecal matter from poultry which can easily and readily be incorporated into conventional poultry processing lines.

These and further objectives are achieved, according to the present invention, by providing an apparatus, and method of using the same, for removing fecal matter by vacuum from the poultry. The apparatus includes a hollow, substantially tubularly shaped probe adapted to fit through the anus and into the rectal cavity of the poultry, means for inserting into and extracting the probe from the rectal cavity of the poultry and means for drawing air through the probe under vacuum. While the probe is inserted into the anus and rectal cavity and removed therefrom, the vacuum is drawn thereby drawing the fecal matter from the poultry. A water flush is provided to cleanse the probe after the poultry is removed. The apparatus can be installed in a conventional poultry processing line before the venting and eviscerating stations incorporating conventional poultry shackles and conveyors to bring poultry to an remove it away from the invention.

Alternately, the apparatus can further include means for providing a water flush simultaneously while drawing vacuum. Such a water flush aids as a medium for loosening the fecal matter and carrying it away from the poultry.

In either embodiment activation of vacuum, water flush or both simultaneously is controlled by a manifold including a manifold plate which is a flat generally circular plate having patterned openings serving to control the timing and degree of vacuum and water flush.

Preferably an apparatus as described above will be combined with a number of similar apparatuses or stations disposed peripherally around a central control drum which stations rotate together with the drum around a central axis so that the poultry during the fecal removal operation are moved in a circular path around the drum included in the usual conveyor path for poultry processing. The necessary movements of the various clamping elements for temporarily retaining the poultry during fecal removal are brought about by means of control rollers which cooperate with suitable shaped guide paths in the central control drum around which the stations move. Similar control drums and clamping elements are known to be used in venting and inspection devices.

The features of the present invention which are believed to be novel are set forth with particularity in the appended claims.

Other claims and many of the attendant advantages will be more readily appreciated as the invention becomes better understood by reference to the following detailed description and considered in connection with the accompanying drawings.

BRIEF DESCRIPTION OF THE DRAWINGS

FIG. 3 is a partial perspective and partial sectional view of the probe used in one form of the invention;

FIG. 4 is a sectional view of the top manifold used in one form of the invention;

FIG. 5 is a top view of one form of a manifold disc of the present invention;

FIG. 6 is a sectional view of the manifold disc of FIG. 5 taken along lines 6—6;

DETAILED DESCRIPTION OF THE INVENTION

Figure 1:
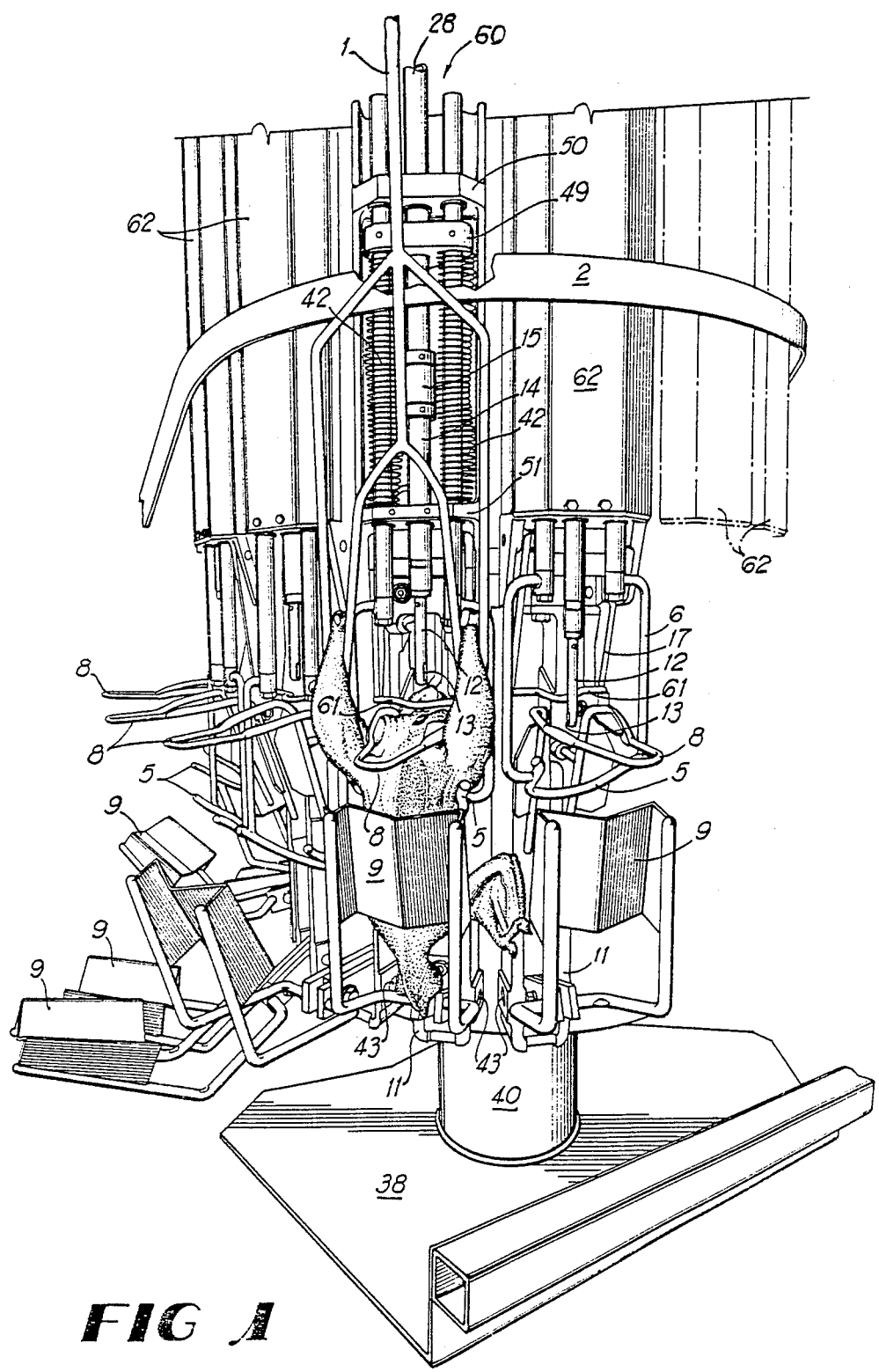
FIG. 1 is a perspective view of the present invention.
Figure 2A:
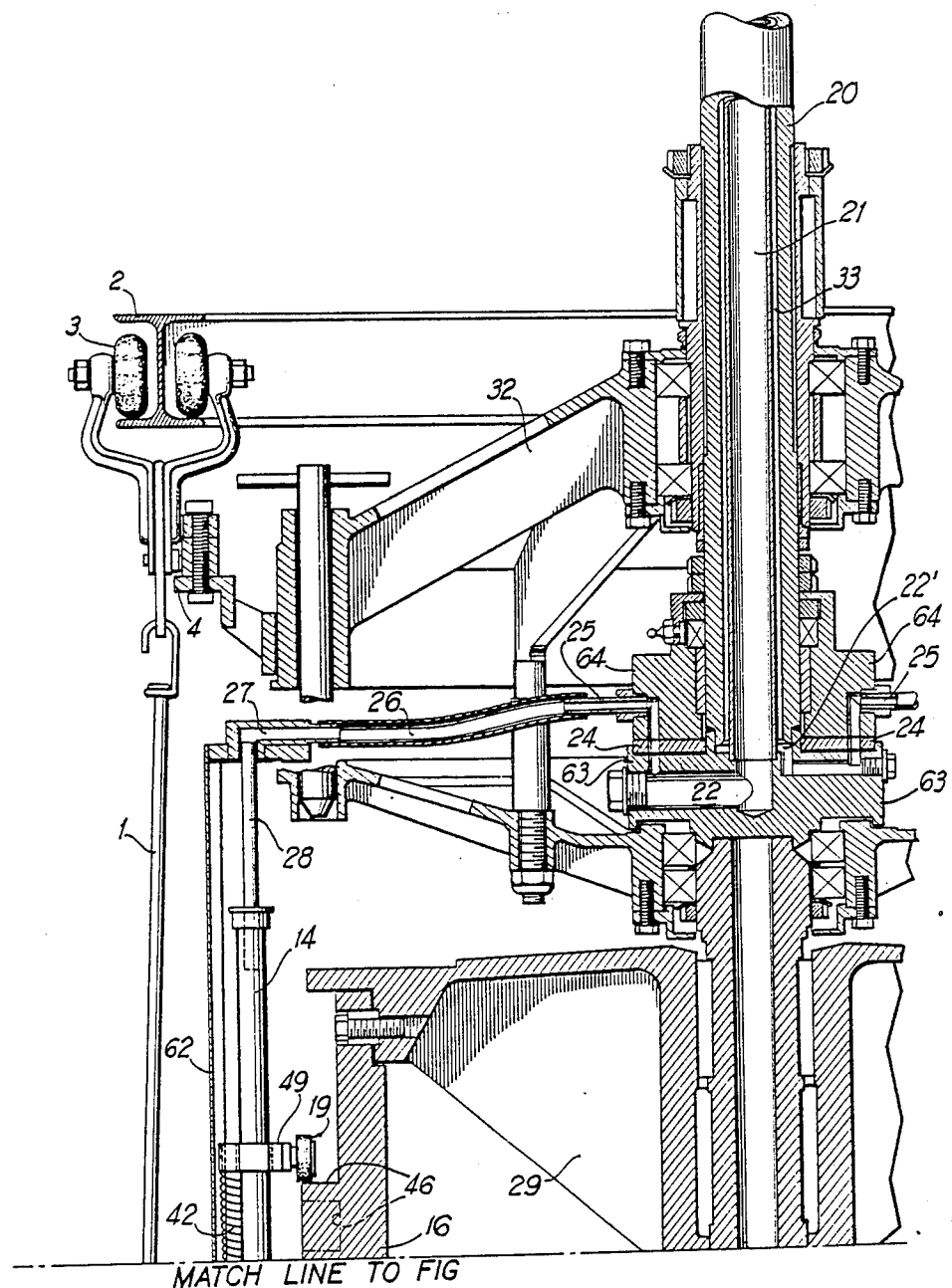
FIGS. 2A and B are top and bottom cross-sectional views of the invention.

Referring to the drawings in detail wherein like numerals designate like parts, a poultry fecal matter removal station 60 embodying apparatus according to the present invention is shown in FIGS. 1, 2A and B. The station 60 is one of generally a number of similar stations obscured by cover plates 62 placed about the periphery of the central control drum described in more detail below. The fecal matter removal stations are placed at an appropriate location in a conventional poultry processing line that is generally after slaughtering and defeathering but prior to venting and evisceration, which processing line includes equidistantly spaced poultry suspension shackles 1 carried by a conventional overhead shackle conveyor 3 including a guide rail 2, FIG. 1.

Figure 2B:
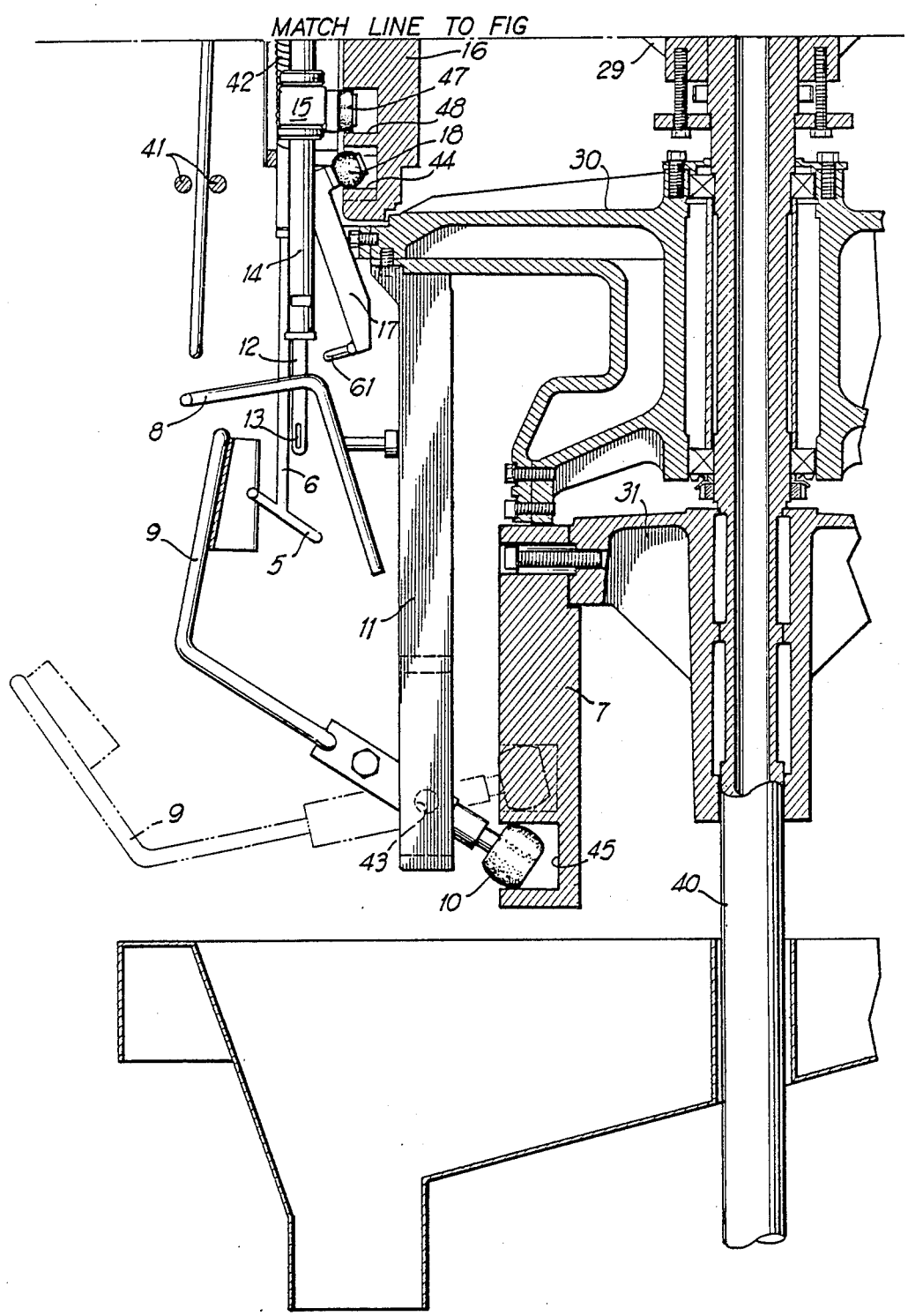

With reference to FIGS. 1, 2A and 2B the fecal matter removal station includes coacting stationary and moving components for securing the poultry while fecal matter is removed and then releasing the poultry for continued travel along the processing line. A stationary frame 29 supporting the probe guide track drum 16 yet to be described, is located below rotating support frame 32 journalled around a vertical axis frame shaft 40. A stationary frame 31 supporting the clamp guide track drum 7, yet to be described, is located below rotating support frame 30, both of which are located below stationary frame 29, journaled around shaft 40. The combination of lower drum 7 and upper drum 16 and stationary frames 29 and 31 forms a central control drum about which the stations 60 rotate.

Each bird suspended by its hocks from one of the shackles 1 of the processing line is delivered in turn to a fecal matter removal station 60. Upon entering the fecal matter removal station 60, each bird is suspended head down with its back facing the station. At this time, the breast clamp 9 is pivoted at 43 on support 11 upward by the movement of roller 10 in guide track 45. The breast clamp 9 contacts the poultry's breast forcing the entire bird upward against the brace 8 mounted on support 11 above pivot 43. At this point, each bird is beginning to traverse a semi-circular path around the drums 7, 16. The guide track path 45 controls the positioning of the breast clamp 9 so as to be in a lowered position when ready to receive the poultry and to release the poultry, and so as to be in a raised position when securing the poultry against brace 8.

Bird lifter 5 is attached to support rod 6 which is held in a generally vertical position by brace guides 50 and 51. The lifter 5 and support 6 are attached to one end of sleeve clamp 49. Guide roller ball 19 is mounted by a bearing on the other end of clamp 49. The guide track path 46 controls the vertical movement of the lifter 5 such that when the breast clamp 9 initially positions the bird against the brace 8, the bird lifter 5 is in its lowest position. Path 46 forces roller 19 vertically upwards causing lifter 5 to engage the thigh area of the bird and lift the bird securely against brace 8. Springs 42 may additionally be provided on support 6.

Tail puller 61 is mounted on one end of tail puller arm 17 is which pivotally attached to rotating frame 30. Guide roller 18 is mounted by a bearing on the other end of arm 17 and travels along guide track 44 in guide track drum 16. The guide track path 44 controls the movement of the arm 17 so as to allow tail puller 61 to grasp and pull the bird's tail away from its anus and toward support 11 before the probe 12 is inserted into and extracted out of the anus of the poultry, ensuring that the tail will not interfere with the probe 12.

The described breast clamp 9, brace 8, lifter 5, and tail puller 61 each act in concert to first orient and position each bird and then to support and immobilize each bird in preparation for the probe insertion to remove fecal matter contained in the anus and rectal cavity.

Circumferentially clamped around the hollow probe shaft 14 is collar 15. Guide roller 47 is mounted by a bearing on collar 15 and travels along guide track 48 in guide drum 16. The guide track path 48 controls the vertical movement of the probe 12 so as to lower and insert the probe into the anus during intermittant vacuum, to raise and extract the probe out of the anus during continuous vacuum, and to keep the probe raised during the cleaning rinse, all described later. Bird lifter clamp 49 includes a bore 52 through which the probe shaft 14 passes, allowing for vertical movement of the shaft while serving to limit lateral movement of the shaft.

With the bird held securely and positioned properly, the probe 12 is rotating on support 32 along with the bird. The probe shaft 14 is forced vertically downward by the action of roller 47 moving in the guide track path 48 on drum track 16 which force the probe 12 down into the anus of the poultry. As the bird continues in a semi-circular path the probe 12 is pulled vertically upward by the reverse action of the roller 47 moving in guide track path 48 which extracts the probe from the anus of the poultry.

At this point, the bird has been cleaned of fecal matter, the probe 12 is in its retracted, most vertically upward position. The breast clamp 9 is now lowered away from the bird by the action of roller 10 moving upward along guide track path 45 on drum 7. Concurrently, lifter 5 is lowered away from the bird by the action of roller 19 moving downward along guide track 46 on guide track support 16 on stationary support 29. This action also lowers the bird down and away from leg positioning brace 8. As the bird continues to be lowered, it ceases to contact any part of the station and each bird leaves the station suspended by its hocks in a freehanging position for further travel along the shackle line in a conventional manner, generally on to a venting station.

The probe 12, as more fully shown in FIG. 3, is a hollow tube dimensioned to fit inside the rectal cavity of the given poultry through the anus. As the probe 12 is lowered according to the invention, rounded tip 12a is inserted into the bird's anus. The tip 12a is rounded so as to prevent tearing of the bird's anus and/or rectum so as to avoid any spillage of fecal matter. As the probe 12 is lowered into the anus, an intermittant vacuum is pulled through the probe 12 which pulls fecal matter from the bird's anus and rectum into the probe 12 through slots 13 and opening 12b. As the probe 12 is extracted according to the invention from the bird's anus, a continuous vacuum is pulled through the probe 12, pulling more fecal matter form the bird's anus and rectum.

The probe has slots 13 along the sides of its distal end through which the fecal matter is pulled by the vacuum when the probe is inserted into the anus. The placement of the slots helps to avoid the rectal cavity from collapsing around the probe upon activation of the vacuum; such a collapsing would cause the vacuum to be ineffective. The probe 12 includes a hole 101 spaced apart from the slots at a distance sufficient to ensure that the hole remains outside the poultry when the probe is fully inserted. Between slots 13 and hole 101, the probe is comprised of two concentrically spaced cylinders providing an air plenum 103 between slots 13 and hole 101. The hole is formed only in the exterior wall of the probe, thus allowing air to pass through hole 101 downward through plenum 103 into the hollow 102 of the probe as vacuum is drawn through the probe. The probe 12 may be secured to shaft 14 by any of a number of ways, but preferably by threads (not shown) allowing for the probe to be threaded into the end of the shaft.

The fecal matter is removed from the station 60 by the vacuum system which may be driven, for example, by a reciprocating pump (not shown). After the fecal matter is pulled through the station, it exits the station and is pulled into a conventional cyclone separator (not shown) where the fecal matter and water remain. As the cyclone fills, a valve (not shown) located on the bottom of the cyclone can be opened and the fecal matter and water are discharged into a storage pan. The storage pan can be emptied through another valve into the local sewage system.

The intermittant vacuum, the continuous vacuum, and the continuous cleaning water stream are controlled by the means of a manifold disc 24 comprised of a generally flat disc with a sequence of openings 34, 35, 36, as shown in FIGS. 5 and 6. The manifold disc 24 is located axially around the station's central shaft 40 and supported by top manifold 64 and bottom manifold 63. The manifold disc 24 remains stationary as supports 32 and 30 rotate axially around shaft 40.

At the beginning of the fecal matter removal sequence when the probe 12 is lowered and inserted into the anus of the bird, probe support shaft 14 slides downwardly along connecting tube 28, which is attached to rotating support 32. Conduit 27 bored through rotating support 32 connects tube 28 and connecting tube 26, which in turn is connected to conduit 25 in top manifold 64, and is in communication with the various openings in the manifold disc 24. On the other side of the manifold, a pair of conduits 22, 23 is bored in the lower manifold 63 for the openings 34, 35 in the manifold disc. The conduits 22, 23 in turn communicate with the hollow center 21 of shaft 40.

As rotating support 32 rotates around shaft 40, conduit 25 passes in a circular path over the top surface of manifold disc 24 and over the sequence of small vacuum openings 34, long vacuum opening 35, and long water opening 36. As the probe 12 is being forced vertically downward into the anus of the bird, conduit 25 is being rotated over the manifold disc 24 from point A to point B on FIG. 5 and sequentially over small vacuum openings 34. A vacuum is pulled through the hollow center 21 of shaft 40 and conduits 22, 23 of lower manifold 63 which, when conduit 25 moves over small vacuum openings 34, creates a vacuum through the probe 12 and its associated connection means 14, 28, 27, 26, 25. Fecal matter is drawn through the slots 13 and the end 12b of the probe 12, through the system of connecting tubes and conduits described above and out to waste. The sequence of small vacuum openings 34 produces an intermittent vacuum, which is preferred over a continuous vacuum on insertion of the probe to avoid the gut of the poultry from collapsing onto the probe and sealing the slots in the probe preventing further vacuum.

As the probe 12 then is being extracted from the anus of the bird, conduit 25 is being rotated over the manifold disc 24 from point B to point C on FIG. 5 and over the long vacuum opening 35. The long vacuum opening 35 allows vacuum to be pulled in a continuous manner through the probe system, described above, as the probe 12 is being removed from the anus of the poultry. As the probe 12 is fully extracted from the anus of the bird, conduit 25 is located over point C of the manifold disc 24.

The amount of vacuum drawn should not be so much as to cause the gut of the poultry to collapse onto the probe sealing it off to further vacuum. Accordingly, it has been found that the vacuum should ordinarily be in the range of about 5" to about 18" of mercury. Preferably, the pulsed infeed vacuum is in the range of about 5" to about 8" of mercury while the full continuous vacuum during extraction of the probe is about 15" to about 18" of mercury. The timing and degree of vacuum is controlled by the size and location of the openings 34, 35, 36 in the manifold disc 24.

After all fecal matter has been removed from the bird and the bird continues along the shackle line for further processing, rotating supports 32 and 30 move around to the back of the station 60. At this point tube 25 is located over long water opening 36. Cleaning water is forced down the hollow 33 created by sleeve 20 in shaft 40, through conduit 22' in lower manifold 63 and continues through the long water opening 36 in manifold disc 24, and in reverse direction through the probe system through conduit 25, connecting tube 26, hollow path 27, connecting tube 28, and out through the probe 12 by way of slots 13 and end opening 12b. By such method, the fecal matter is flushed from the system prior to probe 12 insertion into another bird. This prevents possible contamination of other oncoming birds which will receive the probe 12 of the fecal matter removal station.

Figure 8:
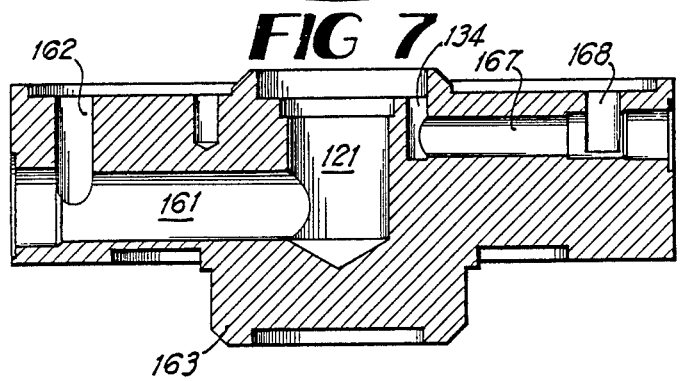
FIG. 8 is a sectional view taken along lines 8—8 in FIG. 7.
Figure 9:
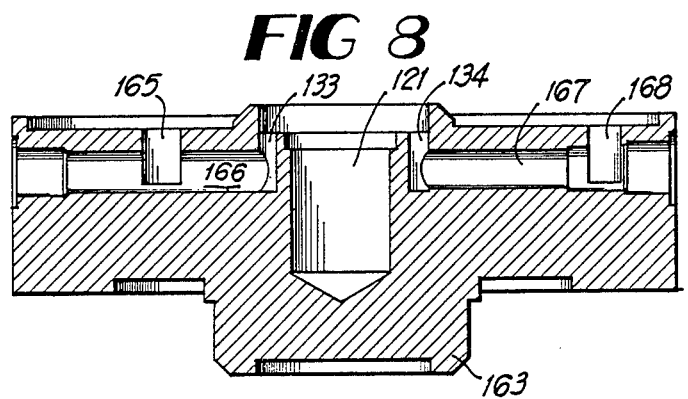
FIG. 9 is a sectional view taken along lines 9—9 in FIG. 7.
Figure 10:
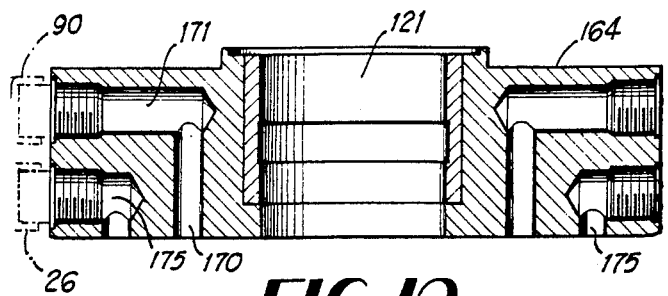
FIG. 10 is a sectional view of an alternate embodiment top manifold.
Figure 11:
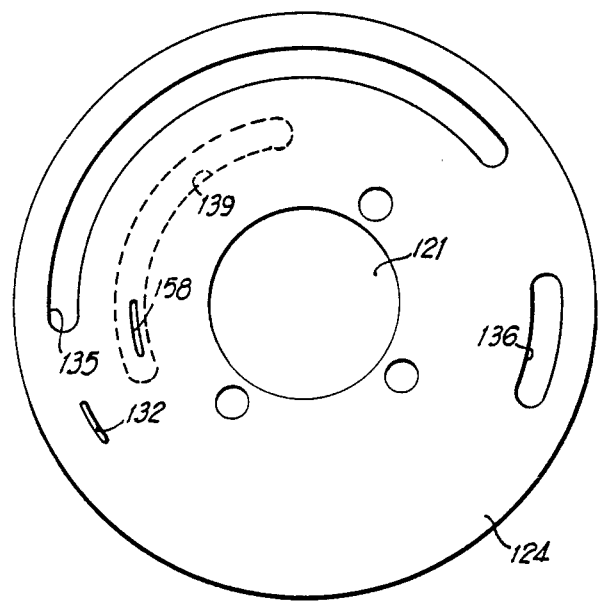
FIG. 11 is a top view of an alternate embodiment manifold disc.
Figure 13:
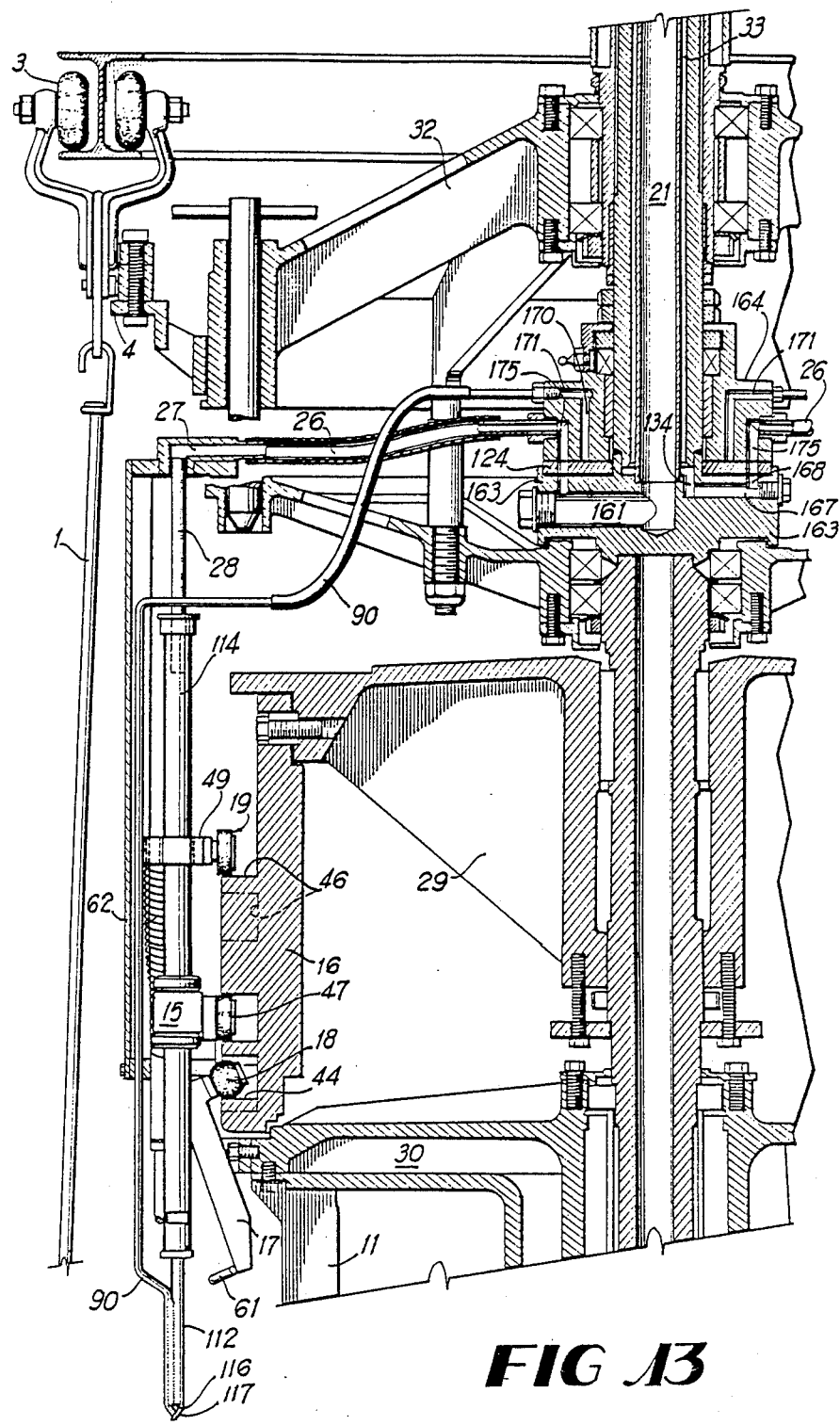
FIG. 13 is a sectional view of an alternate embodiment of the invention as illustrated in FIGS. 2A and 2B.

As one alternate embodiment, the station can also operate under an initial flush/probe mode as illustrated in FIG. 13. In this alternate embodiment all of the parts are the same as in FIGS. 2A and B, with the exception of the alternate top manifold 164, as shown in detail in FIG. 10, the alternate bottom manifold 163, as shown in detail in FIGS. 7, 8 and 9, the alternate manifold disc 124, as shown in detail in FIG. 11, water tube 90, and new probe 112.

In this embodiment prior to the bird entering the station 60, slot 132 in manifold disc 24 allows an initial vacuum to be pulled through the probe 112 removing any residual fecal matter or water remaining in the probe ensuring that no residual fecal matter will drip onto the poultry as it enters the station 60. Probe 112 is then inserted according to the invention into the bird's anus. When the probe is inserted about ¼", water is forced into the bird's anus through tube 90 which is attached to probe 112, shown in more detail in FIG. 12.

Water is supplied to the probe 112 by travelling down hollow sleeve 33 on shaft 40, through conduits 133, 166, 165 in bottom manifold 63, and through the narrow slot 138 in manifold disc 124. After the water travels through slot 138 of manifold disc 124, it travels through conduit 170, conduit 171, and finally down into tube 90 and into the bird's anus. Concurrently, a continuous vacuum is pulled through probe 112 in contrast to the intermittent vacuum pulled in the first embodiment. Slot 135 on new manifold disc 124 allows this continuous vacuum. Fecal matter and water from the initial flush described above are drawn through the end 116 of now slotless probe 112, in a continuous fashion during both insertion and extraction. This waste follows the before-described path up through the connecting system, including conduit 165 in new top manifold 164. It is generally preferred in this embodiment to begin the water injection just prior to initiating the vacuum to allow the water to loosen and partially dissolve the fecal matter.

After the probe 112 is extracted from the bird's anus, the water flush travelling down hollow sleeve 33 on shaft 40 travels through conduits 134, 167, 168 in the bottom manifold 163, and slot 136 on manifold disc 124. The water then exits through conduit 175 on top manifold 164, back through the probe system and out probe 112, thus cleaning the probe of any fecal matter remaining from the vacuum activity.

Figure 7:
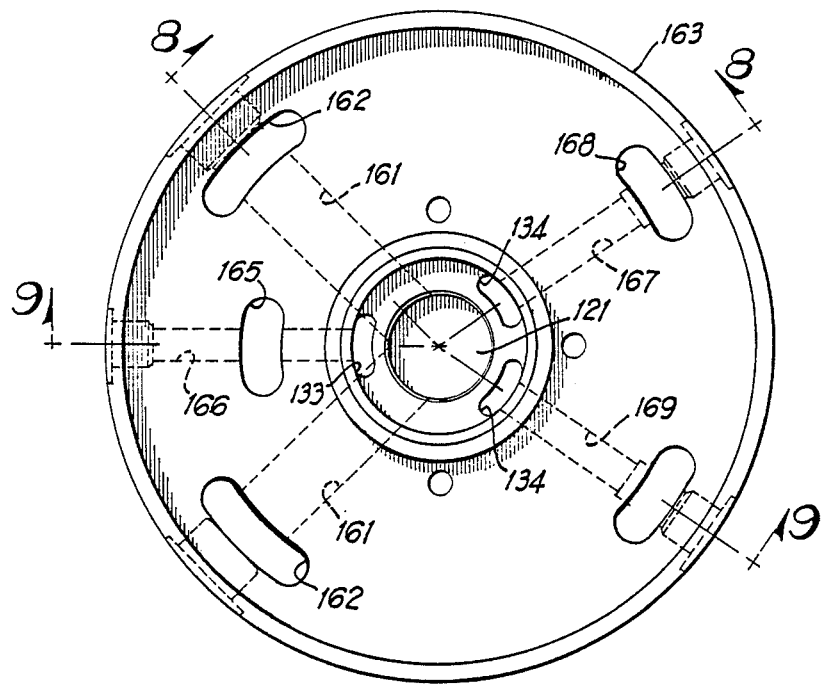
FIG. 7 is a top view of an alternate embodiment of the bottom manifold of the present invention.

Channel 169 on bottom manifold 163, shown in FIG. 7, is an alternate channel duplicating the function of channel 167. Channel 167 is used when the station 60 is operated in a clockwise fashion, while channel 169 is used when the station 60 is operated in a counterclockwise fashion.

Figure 12:
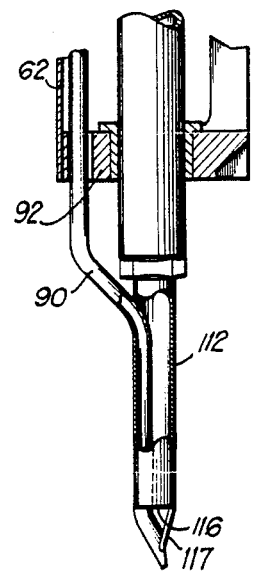
FIG. 12 is a sectional view of a partial perspective and a partial sectional view of an alternate embodiment probe.

In this alternate embodiment, FIG. 12, probe 112 is now a hollow tube with one hole 116 facing downward, as opposed to having the slots 13 in the original configuration. Water tube 90 moves vertically upward and downward and inserts into and extracts from the bird's anus with the probe 112. The water tube 90 and lip 117 form a conical design at the tip of the probe with the end of the water tube positioned below the opening 116 in the probe. If additional stability is required water tube 90 may be attached to the probe support shaft 114 by clamp 92.

All of the water flushed through the probe to clean it on the backside of the station drips into collection pan 38 and exits the station through drain 39. Collection pan 38 also collects any extraneous dripping from the birds or the station.

The fecal matter removal method is thus carried out completely automatically with the assistance of simple and direct acting apparatus components in a continuous repetitive cycle. The fecal matter is removed before evisceration and in such a manner so as not to contaminate the bird. The advantages of the invention over the prior art should be readily apparent to those skilled in the art without the necessity of any further description herein.

It is to be understood that the form of the invention herewith shown and described is to be taken as a preferred example of the same, and that various changes in the shape, size and arrangement of parts may be resorted to, without departing from the spirit of the invention or scope of the subjoined claims.

What is claimed is:

1. In an automated poultry processing line, an apparatus for removing fecal matter from the rectal cavity of poultry comprising:
   (a) a hollow substantially tubularly shaped probe, one end of the probe having an open end and being dimensioned to fit inside of the rectal cavity through the anus of the poultry;
   (b) means for inserting the open end of the probe through the anus into the rectal cavity of the poultry and for extracting the probe from the poultry, said inserting means including a guide means attached to said probe, and track means, the guide means interacting with said track means to impart motion to said probe; and
   (c) means for drawing a vacuum through the probe while positioned within the poultry, thereby removing the fecal matter from the rectal cavity of the poultry.

2. An apparatus for removing fecal matter from the rectal cavity of poultry as described in claim 1 wherein said vacuum is drawn in a pulsating manner during insertion.

3. An apparatus for removing fecal matter from the rectal cavity of poultry as described in claim 1 where said vacuum is drawn in a continuous manner during extraction.

4. An apparatus for removing fecal matter from the rectal cavity of poultry as described in claim 1 including a means for flushing the probe with a fluid after the probe is extracted.

5. An apparatus for removing fecal matter from the rectal cavity of poultry as described in claim 4 where said fluid is water.

6. An apparatus for removing fecal matter from the rectal cavity of poultry as described in claim 1 including a clamping means for securing said poultry.

7. An apparatus for removing fecal matter from the rectal cavity of poultry as described in claim 1 wherein said means for drawing a vacuum is a reciprocating pump.

8. An apparatus for removing fecal matter from the rectal cavity of poultry as described in claim 7 where the range of said vacuum is from about 5 inches of mercury to about 18 inches of mercury.

9. An apparatus for removing fecal matter from the rectal cavity of poultry as described in claim 1 wherein said channel includes an opening in the side of the probe allowing ambient air to communicate with the channel.

10. An apparatus for removing fecal matter from the rectal cavity of poultry as described in claim 1, further including conveyance means for bringing the poultry to and removing the poultry from the apparatus on a continuous basis.

11. An apparatus for removing fecal matter from the rectal cavity of poultry as described in claim 1, further including means for injecting water into the rectal cavity at least part of the time while vacuum is drawn through the probe.

12. An apparatus for removing fecal matter from the rectal cavity of poultry as described in claim 11, wherein the means for injecting water is activated prior to initiation of vacuum while the probe is positioned within the poultry.

13. An apparatus for removing fecal matter from the rectal cavity of poultry as described in claim 1, wherein said probe includes a channel for allowing the ambient air to enter the probe when fully inserted into said rectal cavity.

14. In an automated poultry processing line, a method of removing fecal matter from the rectal cavity of poultry, comprising the steps of:
   (a) providing a hollow, substantially tubularly shaped probe, one end of which having an opening and being dimensioned to fit inside the rectal cavity through the anus of the poultry;
   (b) securing the poultry in a position to receive the probe through the anus into the rectal cavity;
   (c) inserting the probe inside the rectal cavity through the anus of the poultry;
   (d) injecting water through the probe while the probe is being inserted inside the rectal cavity through the anus of the poultry;

(e) drawing a vacuum through the probe while positioned within the poultry, thereby removing the fecal matter and the water from the rectal cavity of the poultry; and (f) extracting the probe from the poultry and releasing the poultry.

15. A method for removing fecal matter as described in claim 14 wherein said step of drawing a vacuum through the probe includes drawing the vacuum in a pulsating manner during insertion of the probe into the poultry.

16. A method for removing fecal matter as described in claim 14 wherein the step of extracting the probe further includes continuously drawing a vacuum during the extraction.

17. A method for removing fecal matter as described in claim 14 further including after the extraction step, the step of flushing the probe with fluid after the poultry has been released.

18. A method for removing fecal matter as described in claim 17 wherein water is used as the flushing medium.

19. A method for removing fecal matter as described in claim 14, wherein the step of drawing a vacuum further includes drawing a vacuum in the range of from about 5 inches of mercury to about 18 inches of mercury.

20. A method of removing fecal matter as described in claim 14, wherein said step of drawing a vacuum while the probe is positioned within the poultry further includes injecting water into the poultry while a vacuum is being drawn.

21. A method for removing fecal matter as described in claim 20, wherein the injection of water is begun prior to initiation of vacuum while the probe is positioned in the poultry.

22. In an apparatus for removing fecal matter from the rectal cavity of poultry, a hollow substantially tubularly shaped probe, one end of said probe having an open end and being dimensioned to fit inside of the rectal cavity through the anus of the poultry, comprising:

(a) two concentrically spaced cylinders one within the other with a channel between said cylinders; and (b) a rounded tip on the distal end of the outer concentric cylinder.

23. In an apparatus for removing fecal matter from the rectal cavity of poultry, a hollow substantially tubularly shaped probe as described in claim 22, the outer concentric cylinder having an opening radially spaced therein.

24. In an apparatus for removing fecal matter from the rectal cavity of poultry, a hollow substantially tubularly shaped probe as described in claim 23, further comprising an opening in the side of and spaced from the distal end of said probe at a distance such that when said probe is fully inserted into the rectal cavity through the anus of the poultry said opening in the side of said probe remains outside of the rectal cavity of the poultry.

25. In an apparatus for removing fecal matter from the rectal cavity of poultry, a hollow substantially tubularly shaped probe as described in claim 24, wherein said opening in the side of said probe extends through the wall of the outer concentric cylinder allowing ambient air to communicate with said channel.

26. In an apparatus for removing fecal matter from the rectal cavity of poultry, a hollow substantially tubularly shaped probe as described in claim 23, wherein the distal end of the outer concentric cylinder extends beyond the distal end of the inner concentric cylinder.

27. In an apparatus for removing fecal matter from the rectal cavity of poultry as described in claim 1, wherein said means for drawing a vacuum through said probe is controlled by a manifold plate having patterned sequential openings through the plane of said plate.

* * * * *